(12) United States Patent
Lohr et al.

(10) Patent No.: US 8,076,019 B2
(45) Date of Patent: Dec. 13, 2011

(54) ENERGY STORAGE MODULE AND ELECTRICAL APPARATUS

(75) Inventors: Guenter Lohr, Leinfelden-Echterdingen (DE); Stefan Roepke, Berlin (DE); Rainer Glauning, Aichtal-Groetzingen (DE)

(73) Assignee: Robert Bosch GmbH, Stuttgart (DE)

( * ) Notice: Subject to any disclaimer, the term of this patent is extended or adjusted under 35 U.S.C. 154(b) by 940 days.

(21) Appl. No.: 11/961,119

(22) Filed: Dec. 20, 2007

(65) Prior Publication Data

US 2009/0004555 A1  Jan. 1, 2009

Related U.S. Application Data

(63) Continuation-in-part of application No. 10/396,142, filed on Mar. 25, 2003, now abandoned.

(30) Foreign Application Priority Data

Mar. 30, 2002 (DE) .................................. 102 14 367

(51) Int. Cl.
*H01M 10/50* (2006.01)
*H01M 2/10* (2006.01)

(52) U.S. Cl. ........... 429/99; 429/100; 429/121; 429/178
(58) Field of Classification Search .................. None
See application file for complete search history.

(56) References Cited

U.S. PATENT DOCUMENTS

| | | | |
|---|---|---|---|
| 5,879,833 A | 3/1999 | Yoshii et al. | |
| 6,228,524 B1 | 5/2001 | Koehler et al. | |
| 6,291,099 B1 | 9/2001 | Hall | |
| 6,379,837 B1 * | 4/2002 | Takahashi et al. | ............ 429/151 |
| 6,566,005 B1 | 5/2003 | Shimma et al. | |
| 6,692,864 B1 | 2/2004 | Dansui et al. | |
| 6,783,886 B1 | 8/2004 | Sakakibara et al. | |
| 2002/0064707 A1 | 5/2002 | Wessman | |
| 2003/0017383 A1 | 1/2003 | Ura et al. | |
| 2003/0096160 A1 | 5/2003 | Sugiura et al. | |

FOREIGN PATENT DOCUMENTS

| | | |
|---|---|---|
| CN | 1317161 | 10/2001 |
| DE | 197 50 069 | 5/1999 |
| DE | 100 55 620 | 12/2001 |
| DE | 697 32 450 | 6/2005 |
| EP | 1 191 616 | 3/2002 |
| EP | 1 261 065 | 11/2002 |
| JP | 01006701 | 1/1989 |
| JP | 9-199093 | 7/1997 |
| JP | 10-21891 | 1/1998 |
| JP | 11204151 | 7/1999 |
| JP | 2000-21456 | 1/2000 |
| JP | 2000-58017 | 2/2000 |
| JP | 2001-203004 | 7/2001 |
| JP | 2001-210286 | 8/2001 |
| WO | 01/03231 | 1/2001 |
| WO | 01/65626 | 9/2001 |

* cited by examiner

*Primary Examiner* — John S Maples
(74) *Attorney, Agent, or Firm* — Michael J. Striker

(57) ABSTRACT

An energy storage module for current supply of an electrical apparatus, in particular for an electrical hand-held machining tool, has a plurality of cells for storage of electrical energy, at least one cell support mounting the cells, being in contact with the cells, enclosing the plurality of cells and made from a heat-conductive material, and at least one cooling body formed on the cell support.

16 Claims, 4 Drawing Sheets

ENERGY STORAGE MODULE AND ELECTRICAL APPARATUS

CROSS-REFERENCE TO A RELATED APPLICATION

This application is a continuation-in-part application of application Ser. No. 10/396,142, filed on Mar. 25, 2003, now abandoned, from which the present application claims the benefit of priority.

BACKGROUND OF THE INVENTION

The present invention relates to an energy storage module for current supply of an electrical apparatus, in particular, for an electrical hand-held machining tool.

Modern hand-held machining tools, such as, for example, hand drills or accumulator worm or screw, often are supplied with current with accumulator packs, whereby the accumulator packs comprises multiple cells, which are electrically connected to one another and, for example, are held together by means of a plastic cover.

Upon operation of this type of accumulator pack, however, during both the charging and discharging stages, a substantial heat due to energy loss, which leads to an increase of the temperatures of the cells and, therewith, to a premature change of the cells.

In addition, such an accumulator pack, after the discharge process, has such a high temperature, based on the heat due to energy less, that the charging cannot be begun immediately. Furthermore, a charging apparatus provided for this purpose must first wait until the temperature of the accumulator pack is again lowered, whereby the charging process is delayed.

Moreover, the individual cells of such an accumulator pack, in operation, can have substantial temperature differences, since the head due to energy loss from the outer-lying cells is relative well lead off, while the cells in the center of the accumulator pack mostly form a localization of heat.

In addition, an accumulator pack from the company Makita is distributed, which during the charging process is cooled, in which a cool air flow is blown through the accumulator pack. Disadvantageously, however, for one is the face that the cooling does not take place during the discharging. For another, the interior of this known accumulator pack is contaminated by the cool air flow.

SUMMARY OF THE INVENTION

It is therefore an object of the present invention to provide an energy storage module which is a further improvement of the existing energy storage modules.

In keeping with these objects and with others which will become apparent hereinafter, one feature of the present invention resides, briefly stated, in an energy storage module for current supply of an electrical apparatus, in particular for an electrical hand-held machining tool, comprising a plurality of cells for storage of electrical energy; at least one cell support for mounting of the cells, whereby the cell support is in contact with the cells, encloses the plurality of cells and is made from a heat-conductive material; at least one cooling body being formed on the cell support.

The invention includes the general technical teachings, in which a cell support is provided with at least one cell with an energy storage module, the cell support being made of a heat-conductive material.

The cell support makes possible the drawing off of the heat due to energy loss in the interior of the energy storage module, so that this can be emitted on the outer side of the energy storage module, based on its very good heating conducting ability.

The cell support fixes the cell mechanically, in which the cell, for example, is wedged or fastened or adhered to the support. With an adhesion of the cell support with the cell, preferably a heat-conductive adhesive is used, in order to achieve a good heat transmission from the cell onto the cell support.

In a preferred embodiment of the invention, the cell support has a large heating capacitance, so that the heat due to energy loss transferred from the cell to the cell support only leads to a minimal temperature increase. This is advantageous, since the heating transfer from the cell onto the cell support is conveyed through a large temperature difference.

Preferably, the cell support comprises a material, whose heat conductivity and or specific heat capacitance is greater than that of air, plastic, paper, and/or the material of the cell.

In a preferred embodiment of the invention, the energy storage module has a plurality of cells for storing electrical energy, whereby the heat conductivity and/or the heat capacitance of the cell support is so large that the temperature difference between the individual cells in the charging operation and/or in the discharging operation is essentially smaller than the temperature difference of the cells relative to the surroundings.

Preferably, the heating conductivity and/or the heat capacitance of the cell support, therefore, is so large that the temperature difference between the individual cells in the charging operation and/or in the discharging operation is less than 5, 10, 15, 20, 30, 40 or 50 Kelvin.

Advantageously, the cell support of the inventive energy storage module is in contact with the cells collectively, such that the cell support can carry away the heat from energy loss from all of the cells. The connection between the cell support and the individual cells is preferably planar, in order to achieve the smallest possible heating transfer resistance as possible.

In one variation of the invention, the cell support is made of multiple parts, which is particularly advantageous with large accumulator packs with a plurality of cells. The individual parts of the cell support, hereby, have respectively at least one heat conducting surface, on which the parts of the cell support are connected with one another in a flat or planar fashion. This planar connection between the individual parts of the cell support advantageously makes possible a good heat transfer.

For further improvement of conveying away of the heat, in a preferred embodiment of the present invention, at least one cooling body is provided, which passively gives off the heat or actively blows it from a blower.

Preferably, the cooling body, in this connection, is arranged in a housing opening or projects through this outwardly from the energy storage module. In this manner, advantageously, a direct heat bridge from the interior of the energy storage module outwardly is formed, so that the heat from energy loss in the interior of the energy storage module can be effectively drawn out. The cooling body can be connected with the cell support in the interior of the energy storage module or directly with a cell, in order to cool with priority the temperature-critical interior of the energy storage module.

In addition, an electrical terminal contact is preferably also arranged in the housing opening, via which the energy storage module can be connected with an electrical apparatus or a charging apparatus. The common arrangement of the terminal contact and the cooling body in the housing opening offers the advantage of a simple electrical and thermal contact in an electrical apparatus or in a charging apparatus.

Further, the energy storage module preferably has a mechanical guide, by means of which the energy storage module can be mechanically fixed in an electrical apparatus or in a charging apparatus. The guide, for example can comprise cam grooves, which are arranged on both sides of the housing opening, so that the energy storage module can be inserted in a receiving compartment of the electrical apparatus or the charging apparatus.

The term "energy storage module", as used in the frame of the present invention, is not limited to an accumulator pack. Furthermore, the invention is also realizable with non-rechargeable battery packs as well as with other types of energy storage, which produce heat from energy loss in operation.

In addition, the invention includes an electrical apparatus with an inventive energy storage module, whereby the apparatus can operate as an accumulator-driven, hand-held machining tool or a charging apparatus, for example.

The cooling of the inventive energy storage module, in this connection can be supported by a blower.

BRIEF DESCRIPTION OF THE DRAWINGS

Further advantages are provided in the following description of the drawings. In the drawings, one embodiment of the invention is illustrated. The drawings, the description, and the claims contain a multitude of features in combination. The practitioner also is to recognize individual features and to combine them in further, practical combinations.

DETAILED DESCRIPTION OF THE PREFERRED EMBODIMENTS

Figure 1:
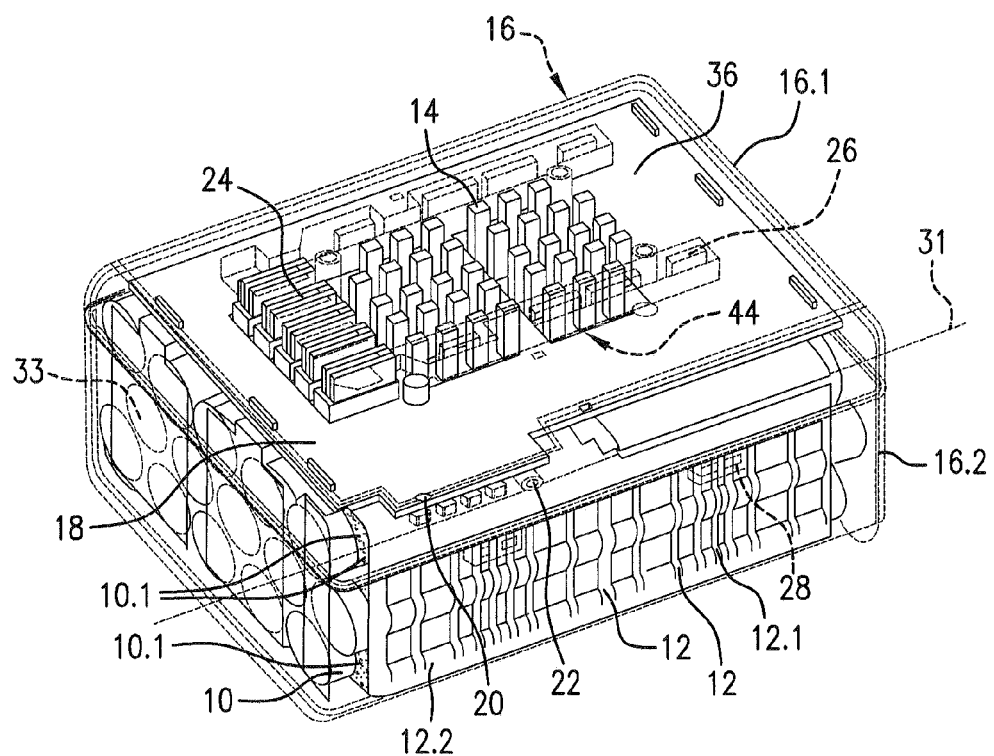
FIG. 1 shows an accumulator pack for a hand-held machining tool according to the present invention.

The perspective, partially cut-away illustration in FIG. 1 shows an accumulator pack for a hand-held machining tool, such as, for example, a hand drill or an accumulator worm or screw driver.

For storage of electrical energy, the accumulator pack has a total of thirty accumulator cells 10 for storage of electrical energy, which have a generally cylindrical shape. Hereby the accumulator cells 10 show a longitudinal direction 31, which should be understood to be the principal axis of a cell 10, in which a cell 10 shows the greatest dimension. In particular the longitudinal direction 31 corresponds to the axial symmetry axis of a cylinder shaped cell 10. In the accumulator pack, respectively, three cells are arranged over one another in a direction 29, which is oriented perpendicular to the longitudinal direction 31 (see FIG. 2). Furthermore, five cells 10 are arranged adjacent one another in a direction 30, which is perpendicular to the directions 29 and 31. Two cells 10 are arranged behind one another in the longitudinal direction 31, whereby a compact form of the accumulator pack is achieved. Hereby the longitudinal axes of two successive cells 10 coincide.

The individual accumulator cells 10 hereby are arranged for mechanical fixing in a honeycomb-shaped or grid-shaped cell support 12 and adhered with the cell support 12 by means of an adhesive 10.1 (see FIG. 1). The grid-shaped cell support 12 can be seen in FIG. 3 and the honeycomb-shaped cell support can be seen in FIG. 4. As can be seen in FIG. 3, the cell support 12 encloses the plurality of cells 10. Hereby the cell support 12 shows four faces being oriented parallel to the longitudinal direction 31 of the cells 10 (see FIG. 2). These four faces are directly connected to each other and enclose the plurality of cells 10, i.e. these four faces cover the plurality of cells 10 in four directions perpendicular to the longitudinal direction 31. These four faces surround the plurality of cells 10 completely. Transversal sides perpendicular to the longitudinal direction 31 are left free of material such as to permit the introducing of the cells 10 into the cell support 12. The cell support 12 shows a plurality of compartments 42, whereby each compartment 42 serves to enclose one cell 10. The cell support 12 extends in the longitudinal direction 31 at least over one cell length $L_c$. Hereby the total length L of the cell support 12, i.e. the dimension of the cell support 12 in the longitudinal direction 31 of the cells 10, is bigger than the length $L_c$ of one cell 10. With the invention a high efficiency in the dissipation of heat from the plurality of cells 10 can be achieved due to the special embodiment of the cell support 12, through which a dissipation over a big surface can be attained: In addition to the mechanical fixing of the accumulator cells 10, the cell support 12, in the frame of the invention also serves for cooling the accumulator cells 10. Especially in the honeycomb-shaped cell support 12 (see FIG. 4) air can advantageously circulate around the accumulator cells 10.

The adhesion of the individual accumulator cells 10 with the cell support 12 takes place by means of a heat-conductive adhesive, so that the heat transfer resistance between the accumulator cells 10 and the cell support 12 is a small as possible. The heat-conductive adhesive is well known e.g., a heat-conductive adhesive like Loctite 315. The heat conductivity should preferably be at least 0.2 W/(m K), preferably at least 0.4 W/(m K).

In addition, the cell support 12 is made of aluminum, which, as a material, has a large heat conductivity and also a large, specific heat capacitance. The cell support 12 can be as well made of e.g. copper and of other materials which have good heat-conductive properties. The heat conductivity of the materials used for the cell support 12 should have a higher heat conductivity and/or a higher specific heat capacitance than that of air, plastic, paper and/or a material of the at least one cell 10. In particular, the heat conductivity of the cell support 12 is so large that a temperature difference between individual cells 10 in a charging operation and/or a discharge operation is essentially smaller than a temperature difference of the cells 10 relative to the surrounding environment. The heat conductivity of the cell support 12 is in particular greater than the heat conductivity of typical plastic, i.e. the heat conductivity is at least 0.2 W/(m K), preferably at least 0.4 W/(m K).

The good heat conductivity of the cell support 12 offers the advantage that the heat from energy loss produced by the interior accumulator cells 10 is lead away outwardly, whereby an overheating of the accumulator pack in the interior is avoided.

The large heat capacitance of the cell support 12 additionally is advantageous, since the cell support 12 therefore can receive a relative large amount of the heat from energy loss from the accumulator cells 10, without being heated. As a result, this heat uptake by the cell support 12 leads then to a lowering of the temperature of the accumulator cells 10.

For the current linkage the accumulator cells 10 are connected with each other by means of conductive plates 33, which are oriented perpendicular to the longitudinal direction 31 and abut an end side of the accumulator cells 10, whereby the end side is perpendicular to the longitudinal direction 31. The conductive plates 33 are electrically connected to electrical terminal contacts 24 for supplying the hand-held machining tool with current.

Figure 5:
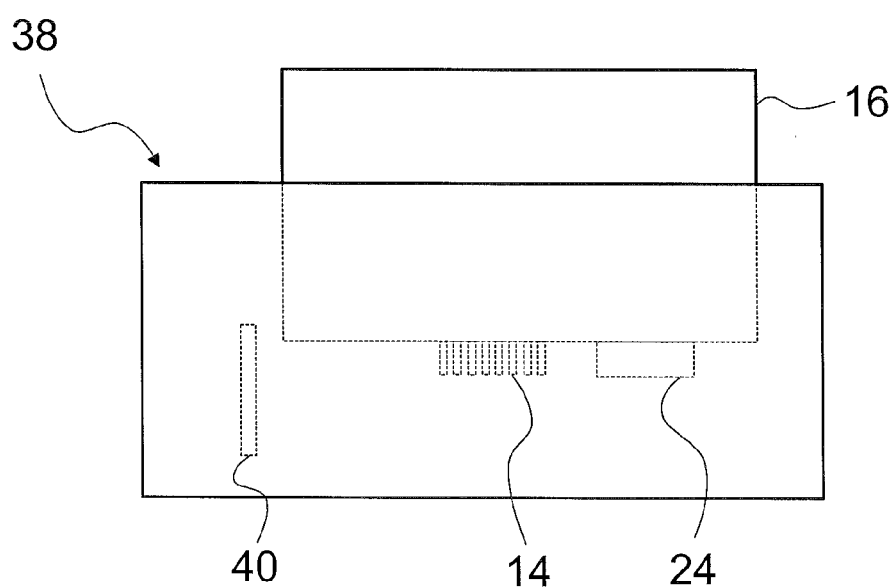
FIG. 5 shows a charger unit in which the accumulator pack is inserted.

On the top side 34 of the cell support 12, numerous cooling bodies 14, are formed, which, likewise, are made of aluminum or other materials showing good heat conductive properties. The cooling bodies 14 are mounted directly onto the top side 34 of the cell support 12. In order to reach an efficient dissipation of heat to the surrounding environment over a big surface an embodiment with at least ten cooling bodies 14 is preferred. In the special embodiment shown in the figures the accumulator pack has at least thirty cooling bodies 14. The cooling bodies 14 are embodied as ribs extending in the direction 29, i.e. they have the greatest dimension in the direction 29, and are therefore oriented perpendicular to the longitudinal direction 31 of the cells 10. The cooling bodies 14 are arranged behind one another in the directions 30 and 31. The cooling bodies 14 should preferably be made of a material that has a heat conductivity of at least 0.2 W/(m K), preferably at least 0.4 W/(m K). The cooling bodies 14 are arranged supplemental to the electrical terminal contacts 24 and do only serve for cooling purposes, i.e. they are, contrary to the electrical terminal contacts 24, not deemed to serve for establishing an electrical contact with an electrical apparatus. The cooling bodies 14 and the electrical terminal contacts 24 are arranged behind one another in the longitudinal direction 31. The cooling bodies 14 have a large upper surface, in order to effectively dispense the heat from energy loss taken up from the accumulator cells 10 to the surrounding air by means of convection or radiation. Upon discharging of the accumulator pack in an electrical apparatus, as well as upon charging in a charging apparatus, the cooling bodies 14 are flowed again with ambient air by means of a blower, in order to improve the heat dispersion by convection. This is illustrated in FIG. 5, in which an electrical apparatus 38 in the form of a charger is shown. For charging the accumulator pack is inserted into a receiving compartment of the electrical apparatus 38 as described below. During the charge procedure, a cooling air flow, which is created by a blower 40 provided in the electrical apparatus 38, is blown onto the cooling bodies 14.

Figure 2:
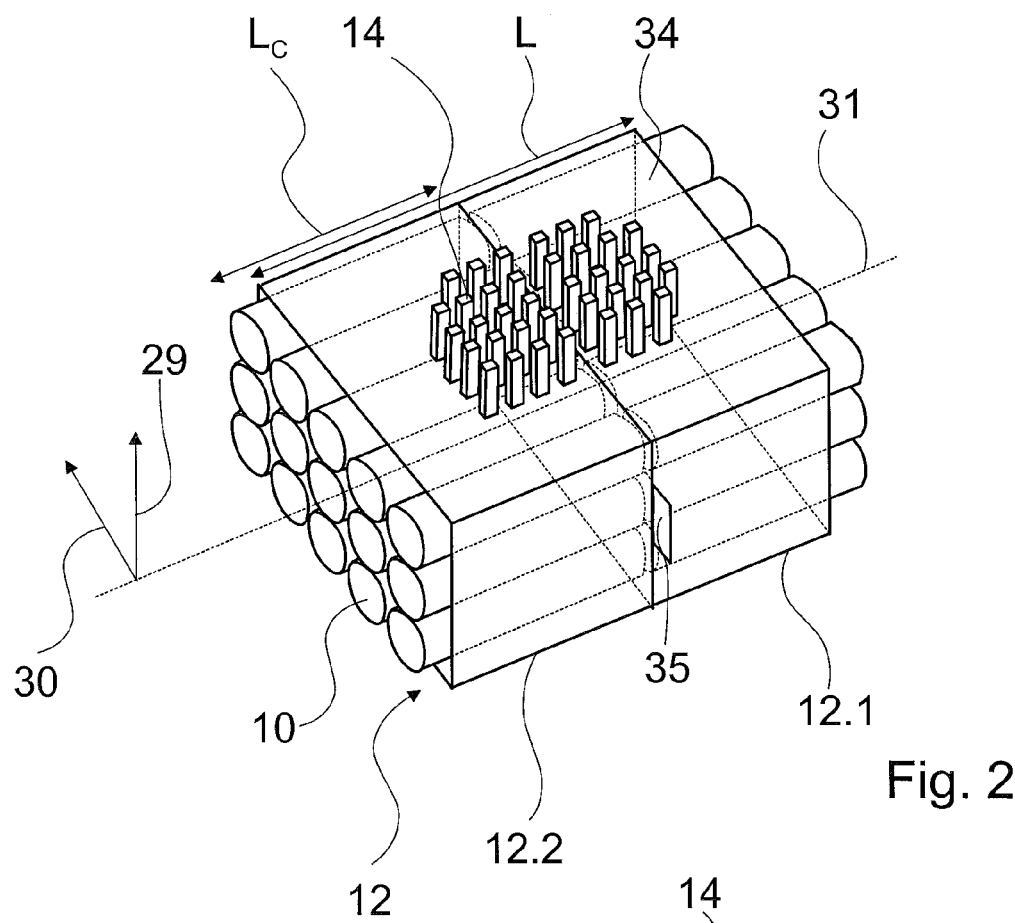
FIG. 2 shows a cell support of the accumulator pack in a mounted state according to the present invention.
Figure 3:
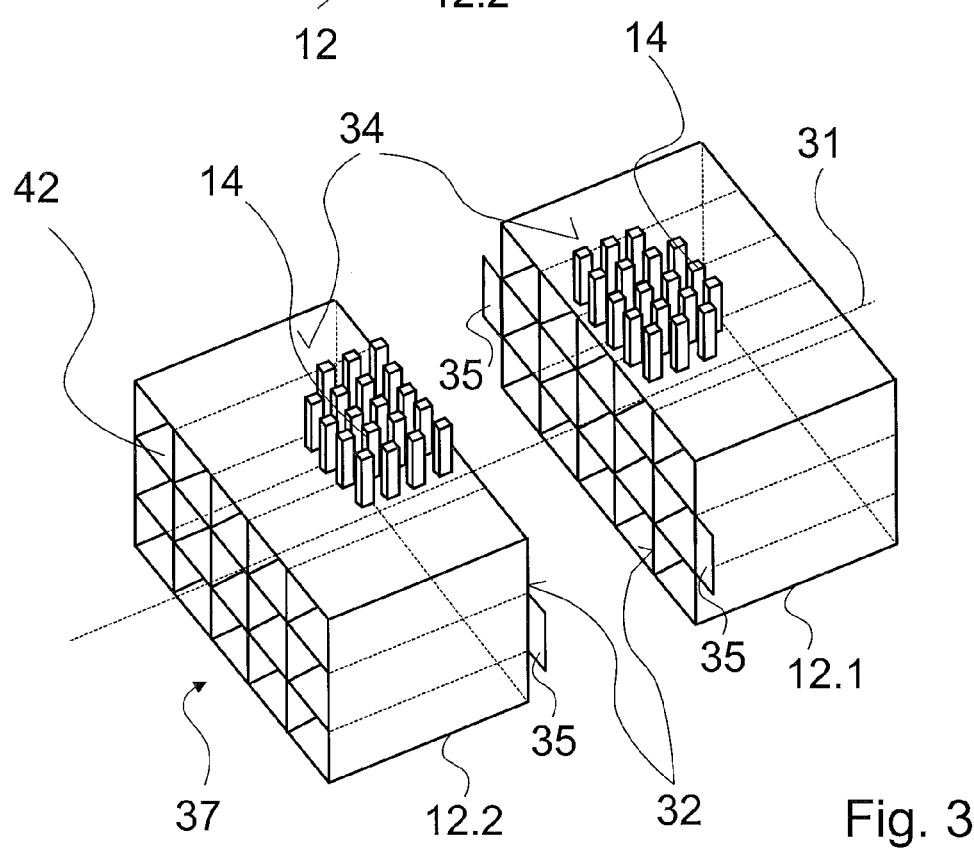
FIG. 3 shows two parts of the cell support in a detailed view, which are separated from each other.
Figure 4:
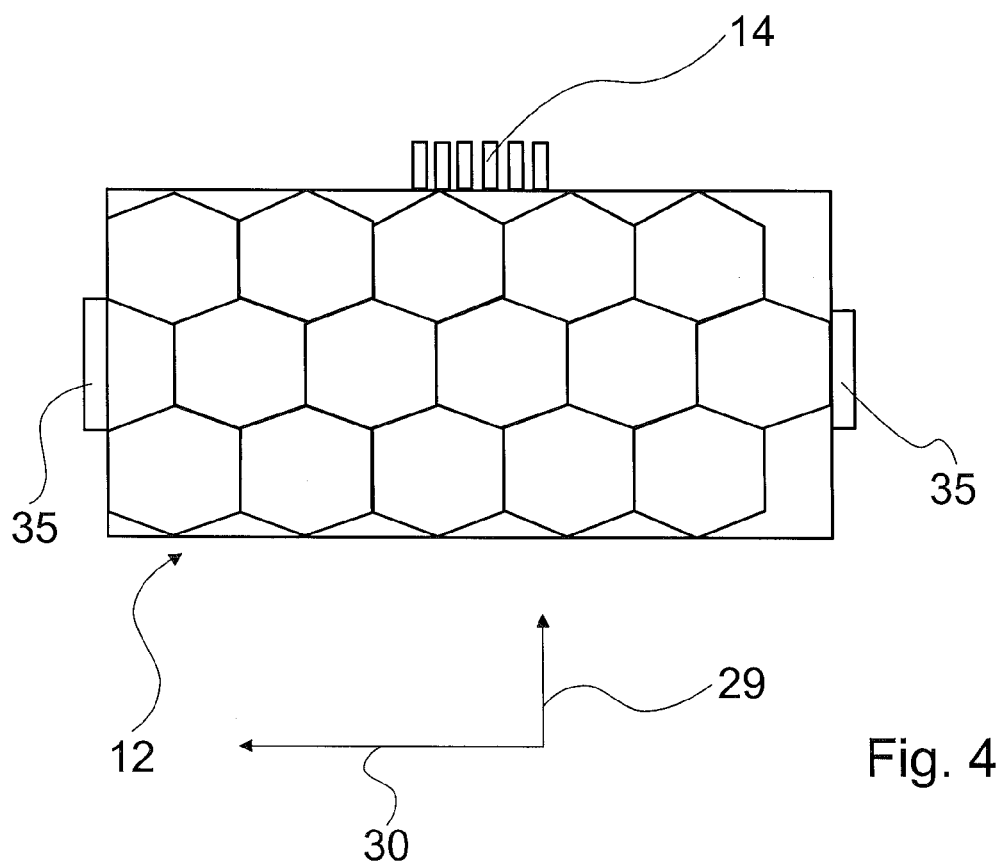
FIG. 4 shows an embodiment of the cell support of FIG. 3 in a front view.

As can be seen in FIGS. 2 and 3, the cell support 12 hereby comprises two parts 12.1, 12.2. FIG. 2 shows the cell support 12 in a mounted state, wherein the two parts 12.1, 12.2 are mounted to each other and the cells 10 are placed inside the cell support 12, whereas FIG. 3 shows the cell support 12 without the cells 10, whereby the parts 12.1, 12.2 for the purpose of clarity are separated from each other. The two parts 12.1, 12.2 each have two opened sides 32, 37 for introducing the accumulator cells 10 and four closed sides for surrounding completely the accumulator cells 10 for a good heat transfer. The two parts 12.1, 12.2 are arranged behind one another in the longitudinal direction 31 of the accumulator cells 10, whereby each part 12.1, 12.2 of the cell support 12 absorbs fifteen accumulator cells 10. The fifteen accumulator cells 10 which are arranged in the part 12.1 form a first set of cells 10 and the other fifteen accumulator cells 10 which are arranged in the part 12.2 form a second set of cells 10. The first set of cells 10 is completely surrounded by the first part 12.1 and the second set of cells 10 is completely surrounded by the second part 12.2. The two sets of cells 10 are arranged behind one another in the longitudinal direction 31 of the cells 10. The first part 12.1 absorbs heat from the first set of cells 10 and the second part 12.2 absorbs heat from the second set of cells 10.

In the mounted state shown in FIG. 2, the two parts 12.1, 12.2 abut on one another. On their front sides 32 which are arranged in such a way that each front side 32 of one part 12.1, 12.2 is opposite to the other front side 32 of the other part 12.1, 12.2, the two parts 12.1, 12.2 of the cell support 12, respectively, have flat surfaces 35, which, in the mounted state, lie flat on one another and are connected to one another by means of screw or other coupling methods, whereby a good heat transfer between the two parts 12.1, 12.2 of the cell support 12 is achieved. In the mounted state shown in FIG. 2, the two parts 12.1, 12.2 are connected to one another via heat conducting surfaces which are built by the respective front sides 32. When the two parts 12.1, 12.2 are connected with each other the accumulator cells 10 are arranged in the cell support 12 in such a way that they have electrical contact with each other. The conductive plates 33 are arranged on one side 37 of one part 12.1, 12.2, whereby this side is opposite to the corresponding front side 32 of the part 12.1, 12.2, for closing the circuit of the accumulator pack. The cooling bodies 14 are arranged on the top side 34 of each of the parts 12.1, 12.2.

Figure 6:
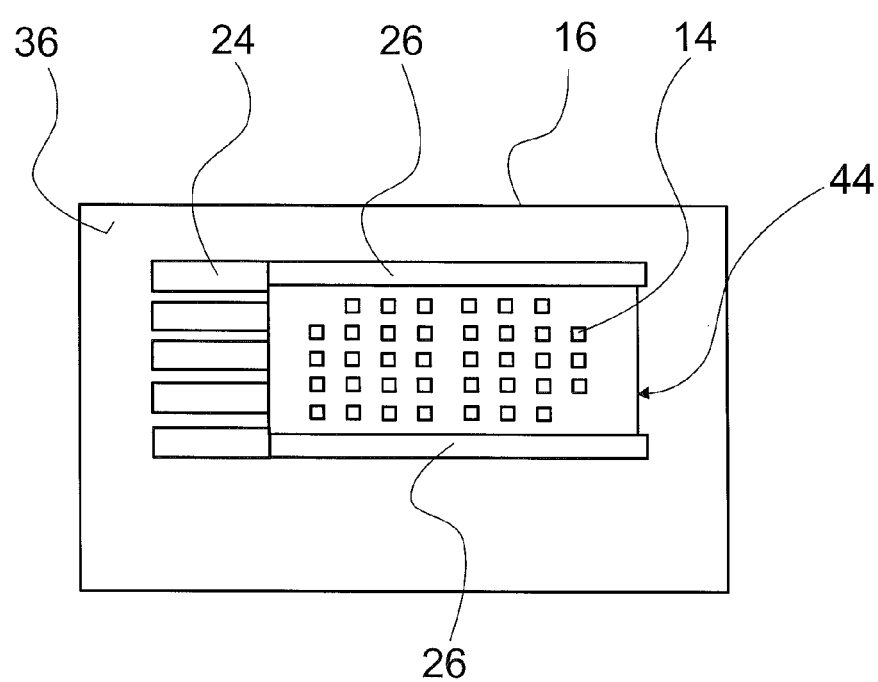
FIG. 6 shows the accumulator pack in a view from above.

In addition, the accumulator pack has a housing 16 made of plastic or other materials. The electrical terminal contacts 24 are arranged on a top side 36 of the housing 16. This top side 36 is oriented parallel to the longitudinal direction 31 of the cells 10. As can be seen in FIG. 6, on the top side 36 of the housing 16 a housing opening 44 is arranged, in which the cooling bodies 14 are placed. The cooling bodies 14 are arranged in the housing opening 16 and are therefore accessible from outside, i.e. the cooling bodies 14 are accessible on the outer side of the accumulator pack through the housing opening 44 and can be cooled well.

In the mounted state shown in FIG. 1, the cell support 12 is fixedly held with the housing 16 by means of snap elements 28 under the form of snap hooks. In particular, the cell support 12 is fixed via these snap hooks to a lower part 16.2 of the housing 16 and the cell support 12 is fixed to an upper part 16.1 of the housing 16 via screws (not shown). The upper part 16.1 and the lower part 16.2 can for the purpose of demounting the accumulator pack be separated from each other and are mounted on one another in the mounted state shown in FIG. 1.

Moreover, the accumulator pack has a circuit board 18, which is attached on the top side 34 of the cell support 12 within the housing 16 and which supports a light diode 20, a switch 22, as well as the electrical terminal contacts 24. The circuit board 18 covers the top side 34 of the cell support 12 over the whole dimension of the cell support 12 in the longitudinal direction 31 of the cells 10, i.e. over the length L, and is provided with openings 46 through which two sets of cooling bodies 14 extend. Thereby the cooling bodies 14 being mounted on the top side 34 of the cell support 12 project outwardly through the openings 46 of the circuit board 18 into the opening 44 of the housing 16 in which they are in contact with the air surrounding the accumulator pack. In view of this, an uninterrupted heat conduction can be established between the cells 10 and the air surrounding the accumulator pack via the cell support 12 being in contact with the cells 10 through the heat conductive adhesive and via the cooling bodies 14 being in direct contact with the cell support 12.

In addition two guide tracks 26 are arranged on the outer side of the housing 16 on both sides of the housing opening, via which the accumulator pack can be inserted into a receiving compartment of an electrical apparatus or a charging apparatus, whereby the guide tracks 26 of the accumulator pack engage correspondingly adapted guide tracks 26 in the receiving compartment. The cooling bodies 14, which project through the circuit board 18, are arranged in the opening 44 of the housing 16 between the guide tracks 26, as can be seen in FIGS. 1 and 6. The cooling bodies 14 are therefore encompassed by the electrical terminal contacts 24 and the guide tracks 26, such that a compact arrangement is reached.

It will be understood that each of the elements described above, or two or more together, may also find a useful application in other types of constructions differing from the types described above.

While the invention has been illustrated and described herein as an energy storage module and electrical apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An energy storage module for current supply of an electrical apparatus, in particular for an electrical hand-held machining tool, comprising:
   a plurality of cells (10) for storage of electrical energy;
   at least one cell support (12) for mounting of the cells (10), wherein the cell support (12) is in contact with the cells (10), encloses the plurality of cells (10) and is made from a heat-conductive material;
   at least one cooling body (14) being formed on the cell support (12); and
   a housing having a top side (36) on which electrical terminal contacts (24) for establishing an electrical contact with an electrical apparatus are arranged and which is configured with an opening (44) in which the at least one cooling body (14) is placed.

2. The energy storage module according to claim 1, wherein the cells (10) show a longitudinal direction (31), in which the cells (10) show their greatest dimension and have a length ($L_c$), and
   wherein the cell support (12) extends in the longitudinal direction (31) at least over one length ($L_c$) of the cells (10).

3. The energy storage module according to claim 1, wherein the cells (10) show a longitudinal direction (31), in which the cells (10) show their greatest dimension, and wherein the top side (36) of the housing extends parallel to the longitudinal direction (31) of the cells (10).

4. The energy storage module according to claim 1, and further comprising at least two mechanical guides (26) being arranged on said top side (36), wherein the at least one cooling body (14) is arranged between the mechanical guides (26).

5. The energy storage module according to claim 1, and further comprising at least ten said cooling bodies (14).

6. The energy storage module according to claim 1, wherein the at least one cooling body (14) is configured as a rib.

7. The energy storage module according to claim 1, wherein the cells (10) show a longitudinal direction (31), in which the cells (10) show their greatest dimension, wherein the plurality of cells (10) is divided into at least two sets of cells (10) and wherein the two sets of cells (10) are placed behind one another in the longitudinal direction (31) of the cells (10).

8. The energy storage module according to claim 7, wherein the at least one cell support (12) is made of at least two parts (12.1, 12.2) which respectively enclose one of the sets of cells (10) and whereby the parts (12.1, 12.2) are placed behind one another in the longitudinal direction (31) of the cells (10) and abut on one another.

9. The energy storage module according to claim 1, wherein the material of the cell support (12) has a heat conductivity that is greater than that of air, plastic, paper and/or a material of the cells (10).

10. The energy storage module according to claim 1, wherein the cells (10) are adhered with the cell support (12) by a heat-conductive adhesive (10.1).

11. The energy storage module according to claim 1, and further comprising a circuit board (18) being mounted on the cell support (12) and having at least an opening (46) through which the at least one cooling body (14) extends.

12. The energy storage module according to claim 1, wherein the cell support (12) shows a plurality of compartments (42) which each enclose one of the cells (10).

13. The energy storage module according to claim 1, and further comprising a housing (16) and at least a snap element (28), by which the cell support (12) is affixed with the housing (16).

14. The energy storage module according to claim 1, wherein the housing (16) has an upper part (16.1) and a lower part (16.2), which are separable from each other for demounting purposes and in a mounted state are mounted onto one another, and wherein the cell support (12) is affixed via the at least one snap element (28) with the lower part (16.2) of the housing (16).

15. An electrical apparatus comprising at least the energy storage module according to claim 1.

16. An energy storage module for current supply of an electrical apparatus, in particular for an electrical hand-held machining tool, comprising:
   a plurality of cells (10) for storage of electrical energy;
   at least one cell support (12) for mounting of the cells (10), wherein the cell support (12) is in contact with the cells (10), encloses the plurality of cells (10) and is made from a heat-conductive material;
   at least one cooling body (14) being formed on the cell support (12); and
   a circuit board (18) mounted on the cell support (12) and having at least an opening (46) through which the at least one cooling body (14) extends.

* * * * *